US006964449B2

(12) United States Patent
Takeda et al.

(10) Patent No.: US 6,964,449 B2
(45) Date of Patent: Nov. 15, 2005

(54) OPENING AND CLOSING CONTROL SYSTEM FOR OPENING-CLOSING MEMBER OF VEHICLE

(75) Inventors: Nobuhiko Takeda, Nukata-gun (JP); Hiroji Ikeda, Nagoya (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 53 days.

(21) Appl. No.: 10/722,400

(22) Filed: Nov. 28, 2003

(65) Prior Publication Data

US 2004/0256881 A1 Dec. 23, 2004

(30) Foreign Application Priority Data

Nov. 27, 2002 (JP) ............................ 2002-344335

(51) Int. Cl.$^{7}$ .................................................. B60J 5/10
(52) U.S. Cl. .............................. 296/146.4; 296/146.8; 296/106; 49/340
(58) Field of Search ......................... 296/146.4, 146.8, 296/106, 56; 49/339–341

(56) References Cited

U.S. PATENT DOCUMENTS 6,382,706 B2 * 5/2002 Yuge et al. .............. 296/146.4
6,398,288 B1 * 6/2002 Yuge ....................... 296/146.4
6,834,463 B2 12/2004 Fukumoto et al.
2002/0040551 A1 * 4/2002 Zhou ........................... 49/339
2004/0090083 A1 * 5/2004 Greuel et al. ............ 296/146.4

FOREIGN PATENT DOCUMENTS

DE 102 45 136 6/2003
JP 2-114071 4/1990
JP 2001-277853 10/2001

* cited by examiner

*Primary Examiner*—Dennis H. Pedder
(74) *Attorney, Agent, or Firm*—Buchanan Ingersoll PC

(57) ABSTRACT

An opening and closing control system for an opening-closing member comprises an opening and closing mechanism for opening and closing the opening-closing member, an actuator for operating the opening and closing mechanism, an electromagnetic clutch for controlling a torque transmission by connecting and disconnecting the actuator and the mechanism, an opening and closing angle detecting means for detecting an opening and a closing angle of the opening-closing member relative to the vehicle, and a control means for controlling an electric power supplied to the electromagnetic clutch based on a detected result from the opening and closing angle detecting means and controlling an electric power supplied to the actuator, in which a supporting force required for supporting the opening-closing member is increased, and the control means for decreasing the electric power supplied to the electromagnetic clutch in accordance the opening-closing operation from an intermediate position to an opened position or a closed position.

10 Claims, 7 Drawing Sheets

(a)

(b)

OPENING AND CLOSING CONTROL SYSTEM FOR OPENING-CLOSING MEMBER OF VEHICLE

Figure 1:
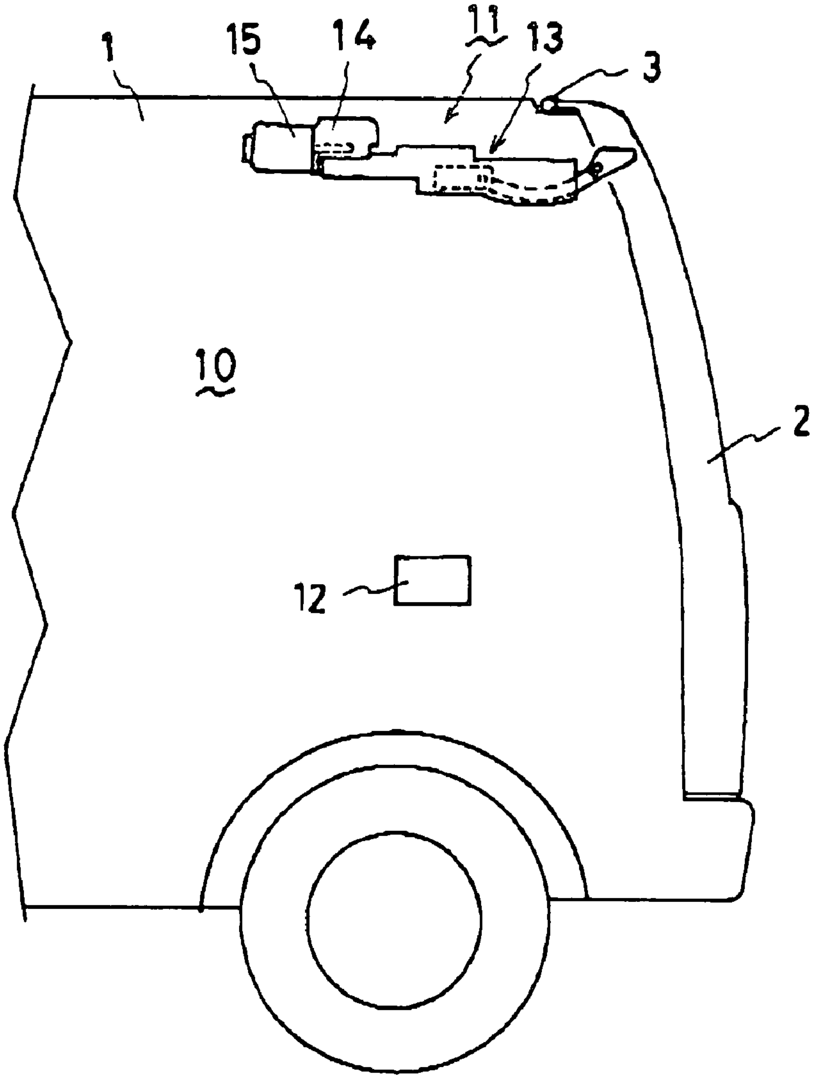
Figure 1:
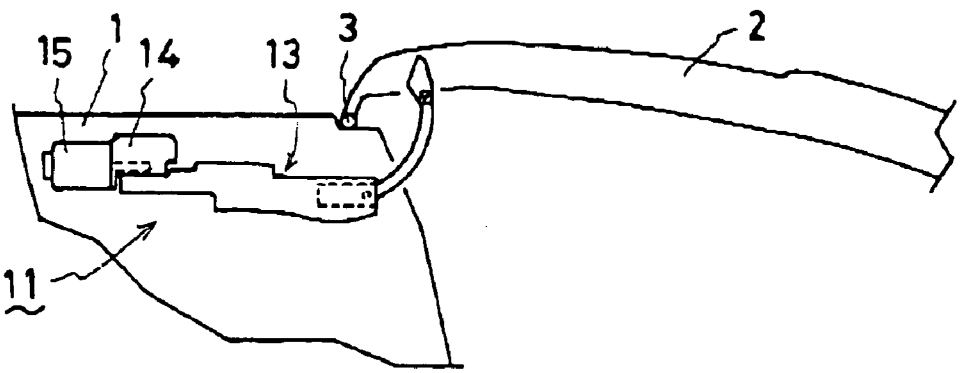

This application is based on and claims priority under 35 U.S.C. § 119 with respect to Japanese Application No. 2002-344335 filed on Nov. 27, 2002, the entire content of which is incorporated herein by reference.

FIELD OF THE INVENTION

This invention generally relates to an opening and closing control system for an opening-closing member of a vehicle. More particularly, the present invention pertains to the opening and closing control system for the opening-closing member of the vehicle which performs an open-close operation for various types of the opening-closing members of the vehicle.

BACKGROUND OF THE INVENTION

A known opening and closing control system for opening-closing member of the vehicle (opening-closing member) is disclosed in Japanese Patent Laid-Open Publication No. 2-114071. The system includes a hinge arm for closing and opening the opening-closing member relative to the vehicle, a motor for activating the hinge arm, and a connecting device for connecting the hinge arm member and a cable which is rotated by the motor. The connecting device includes a mechanism for disconnecting from the hinge arm side when the cable applies a tensility to the connecting device. According to the know opening and closing control system, an load equal to or more than a predetermined amount cannot be applied to the opening-closing member even if a driver applies a load to the opening-closing member for interfering the opening-closing member's closing-operation while the motor rotates for closing the opening-closing member due to the mechanism of the connecting device disconnecting from the connecting device.

In this configuration, once the connecting device disconnects the motor side from the hinge arm side, they need to be connected again.

To prevent the opening-closing member from being applied a load equal to or more than the predetermined amount without using the connecting device, a clutch mechanism may be provided between an actuator and the opening and closing mechanism as disclosed in Japanese Patent Laid-Open Publication No. 2001-277853 kouhou. In this configuration, an engaging force of the clutch mechanism is reversibly controlled, so that the actuator and the opening and closing mechanism are engaged releasing the torque transmission (sliding the clutch mechanism), not completely disengaging the actuator from the opening and closing mechanism (not completely engaging or disengaging) as described above. As a result, the reconnecting operation is not needed after the connecting device disconnects the motor from the hinge arm as described in Japanese Patent Laid-Open Publication No. 2-114071 kouhou. However, if the opening and closing mechanism is adapted to change the supporting force of the opening-closing member based on the opening and closing angle of the opening-closing member, the clutch mechanism can slide only in case that a load which is equal to or more than the supporting force is applied. In other word, the load required for sliding the clutch mechanism changes depending on the opening and closing angle of the opening-closing member. Thus, when a certain load is applied to the opening-closing member at which the supporting force of the opening-closing member is large, the clutch can be slid if the load is equal to or less than the supporting force. Furthermore, the opening-closing member etc. may be damaged due to the load applied to the opening-closing member.

SUMMARY OF THE INVENTION

An opening and closing control system for an opening-closing member of a vehicle comprises an opening and closing mechanism for opening and closing the opening-closing member relative to the vehicle, an actuator for operating the opening and closing mechanism, an electromagnetic clutch for controlling a torque transmission by connecting and disconnecting the actuator and the opening and closing mechanism, an opening and closing angle detecting means for detecting an opening and a closing angle of the opening-closing member relative to the vehicle, and a control means for controlling an electric power supplied to the electromagnetic clutch based on a detected result from the opening and closing angle detecting means and controlling an electric power supplied to the actuator. In this configuration, a supporting force of the opening and closing mechanism required for supporting the opening-closing member of the vehicle is increased in accordance with the movement of the opening-closing member of the vehicle from an intermediate position to an opened position or a closed position, and the control means for decreasing the electric power supplied to the electromagnetic clutch in accordance with the movement of the opening-closing member of the vehicle from the intermediate position to the opened position or the closed position. In addition, the opening and closing mechanism includes a crank gear provided rotatably around a crank shaft for opening and closing the opening-closing member of the vehicle, a slider reciprocating along with a guide member, a crank arm pivotally connected to the crank gear on one end thereof with a crank pin and pivotally connected to the slider on the other end thereof with a slider pin, and an operating member for the opening-closing member for operatively connecting the slider and the opening-closing member of the vehicle, and a length of a perpendicular line, which vertically connects a center of the crank shaft and an arm line connecting a center of the crank pin and a center of the slider pin, or an extension of the arm line in longitudinal direction, when the opening-closing member of the vehicle is located at the intermediate position, is longer than the length of the perpendicular line when the opening-closing member of the vehicle is located at the opened position and the closed position, and the length of the perpendicular line or the extension of the arm line in longitudinal direction is gradually decreased in accordance with the movement of the opening-closing member of the vehicle from the intermediate position to the opened position or the closed position.

BRIEF DESCRIPTION OF THE DRAWING FIGURES

Figure 2:
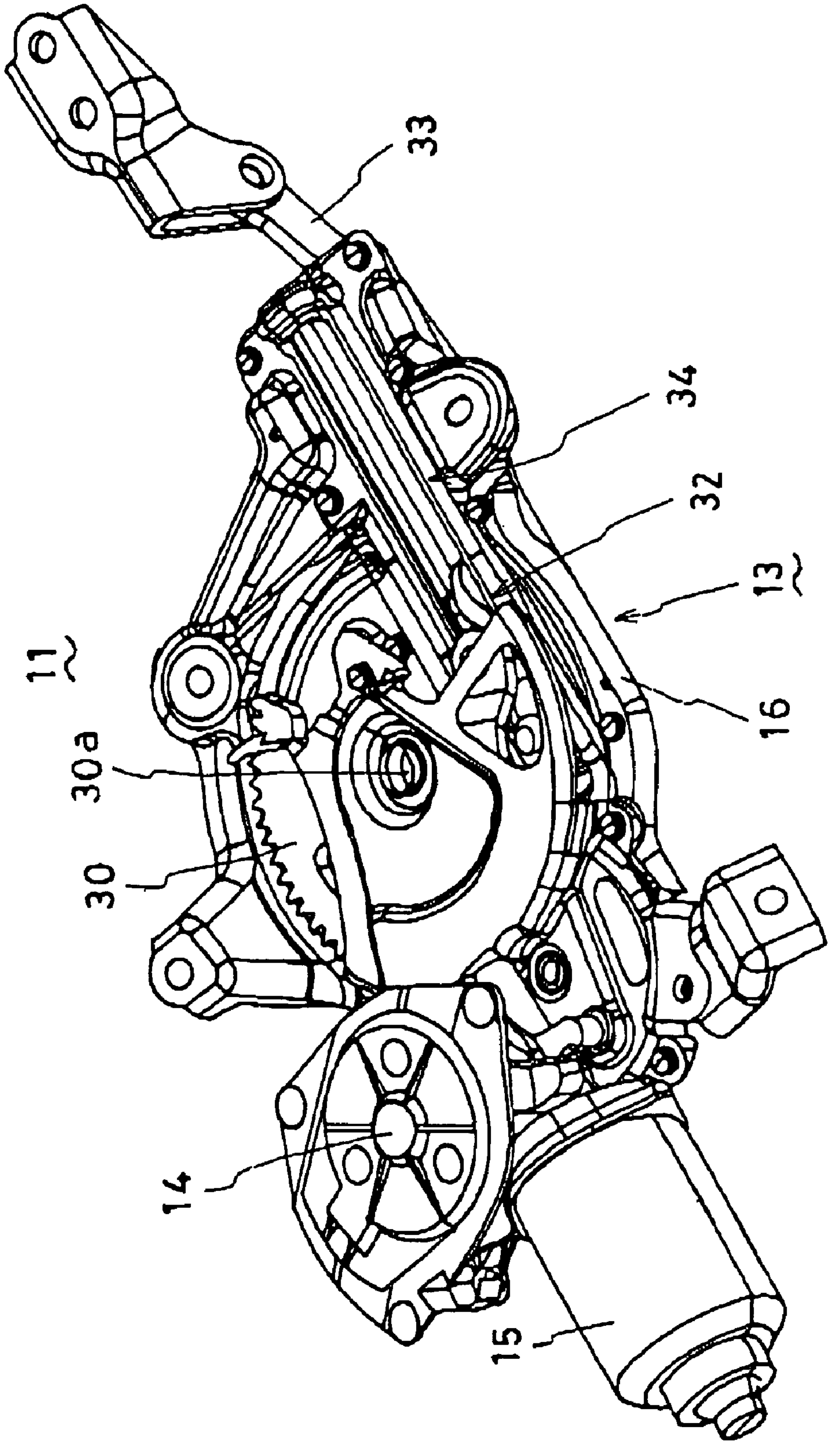
Figure 3:
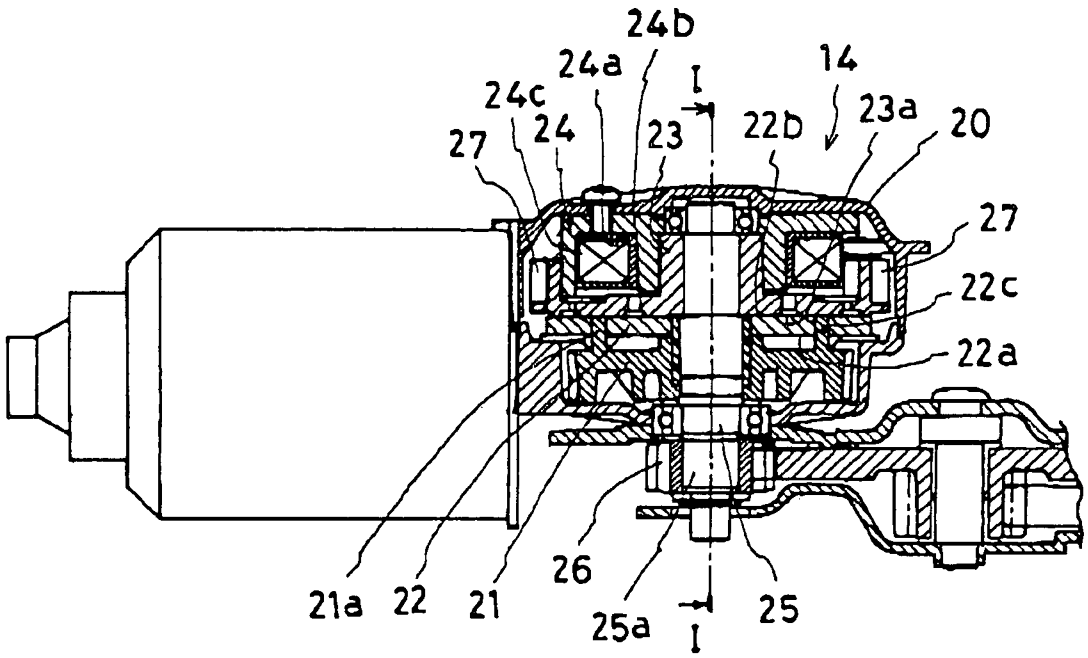
Figure 4:
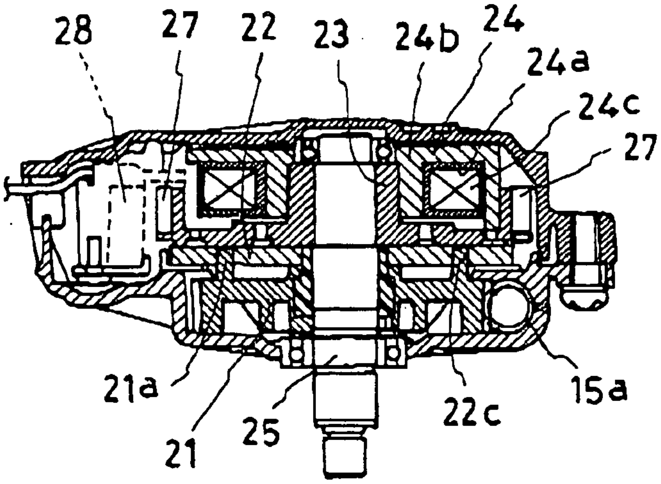
Figure 5:
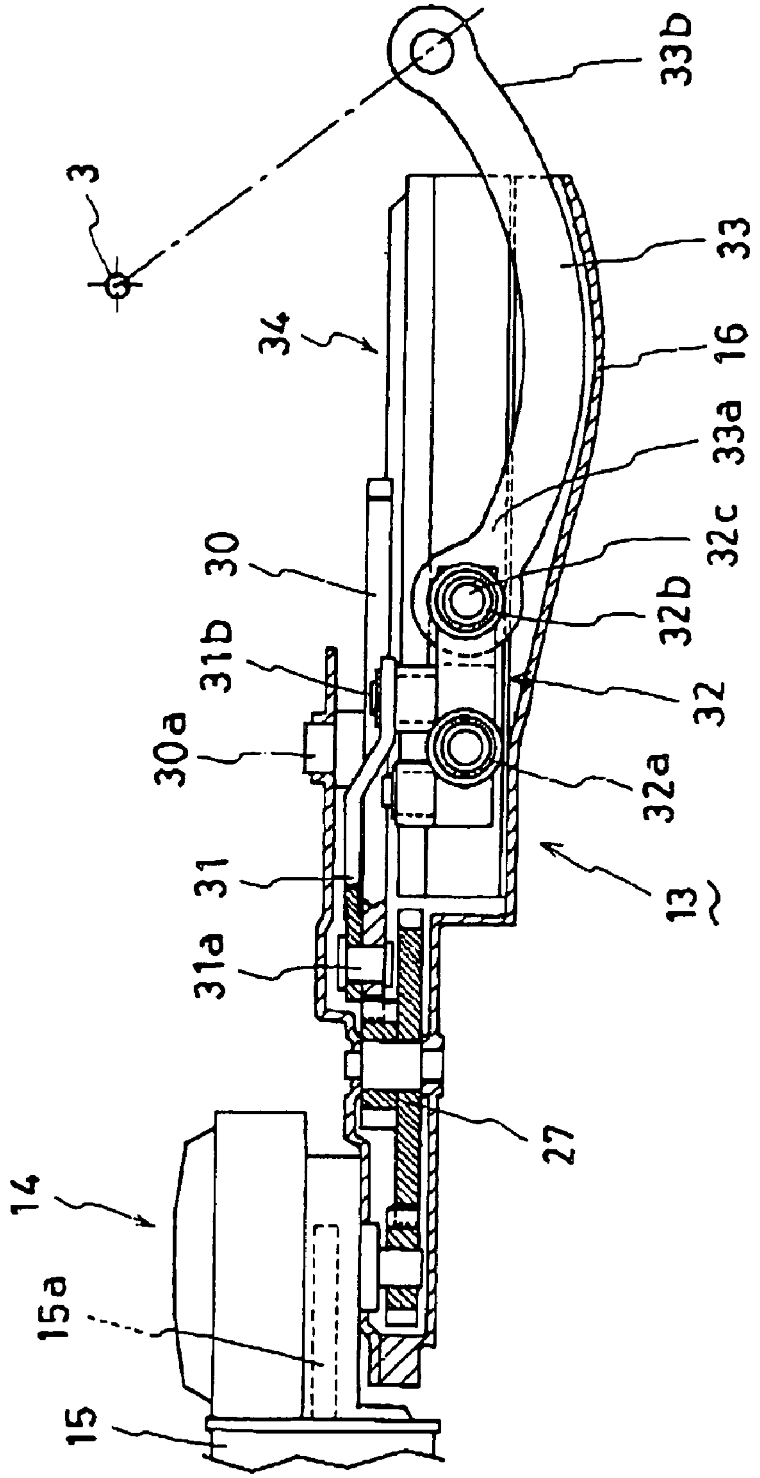
Figure 6:
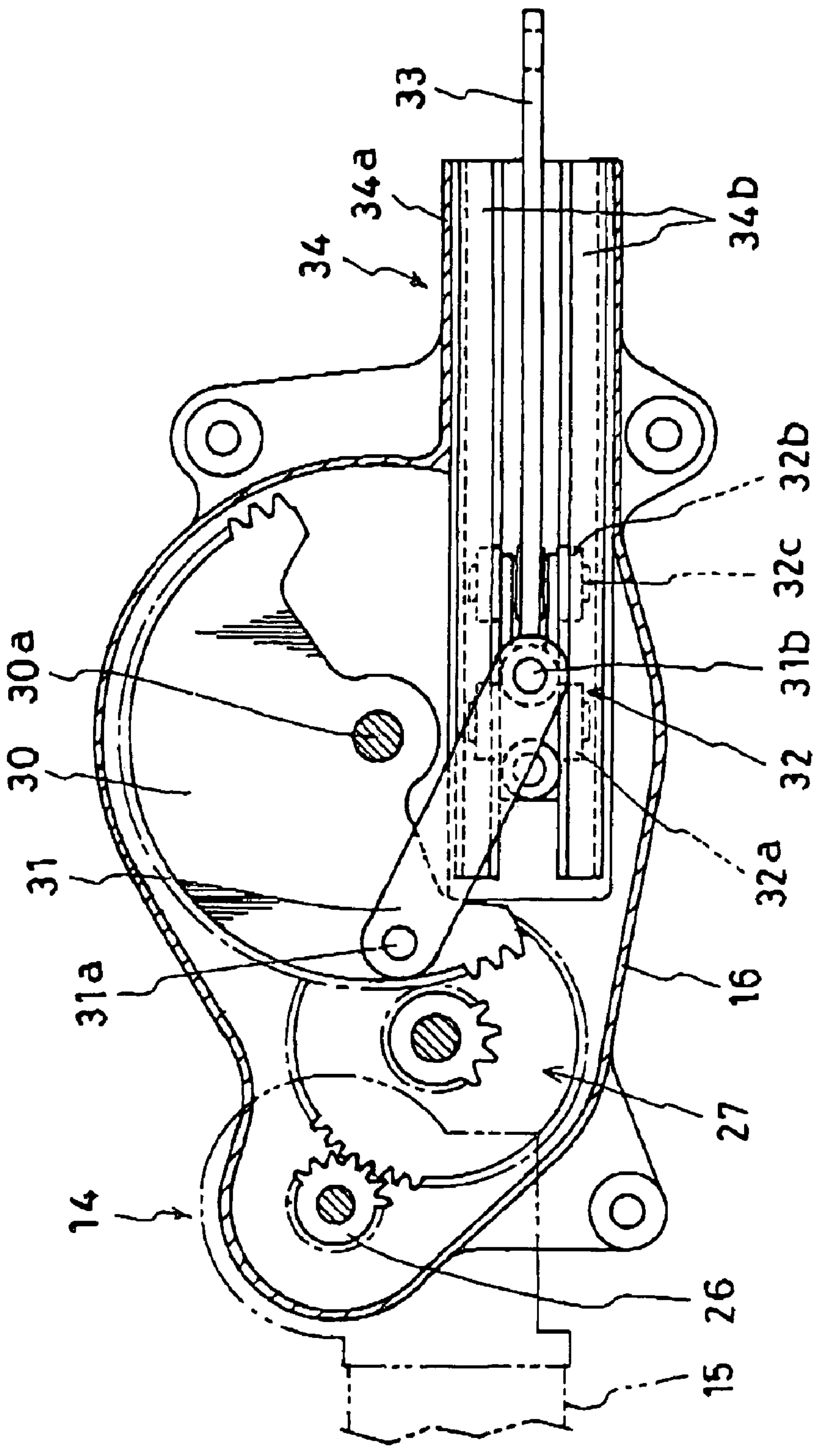
Figure 7:
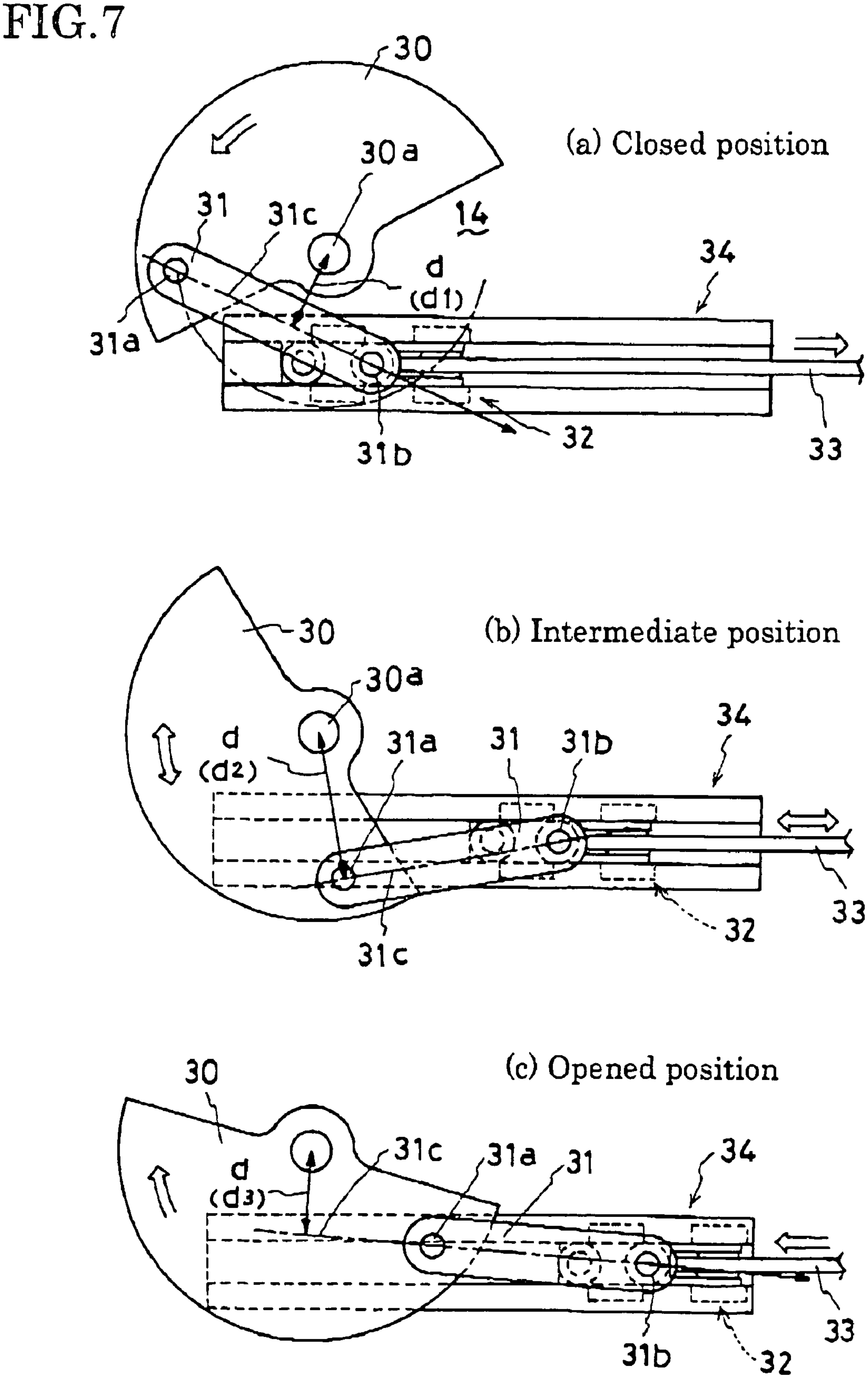
Figure 8:
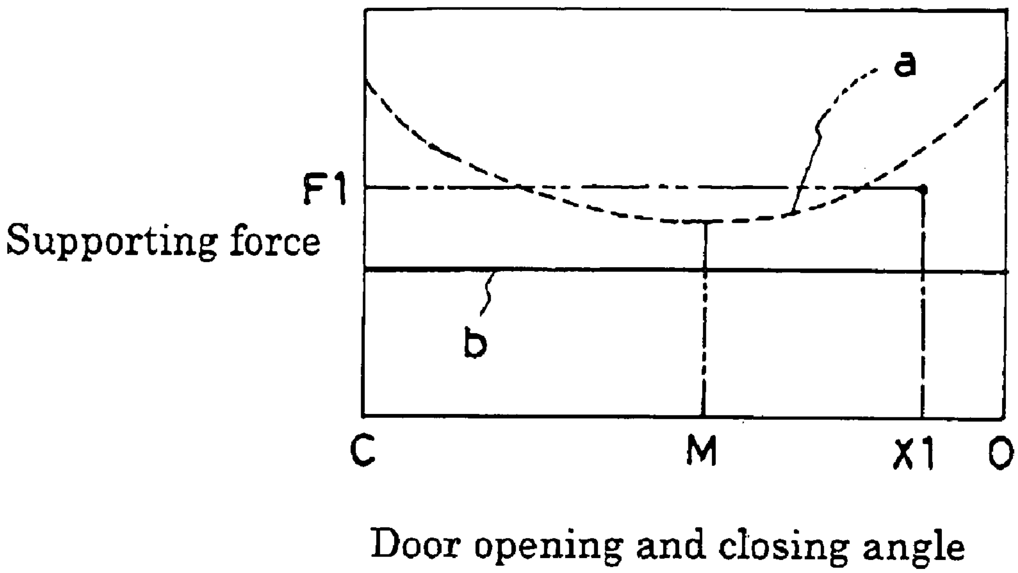
Figure 9:
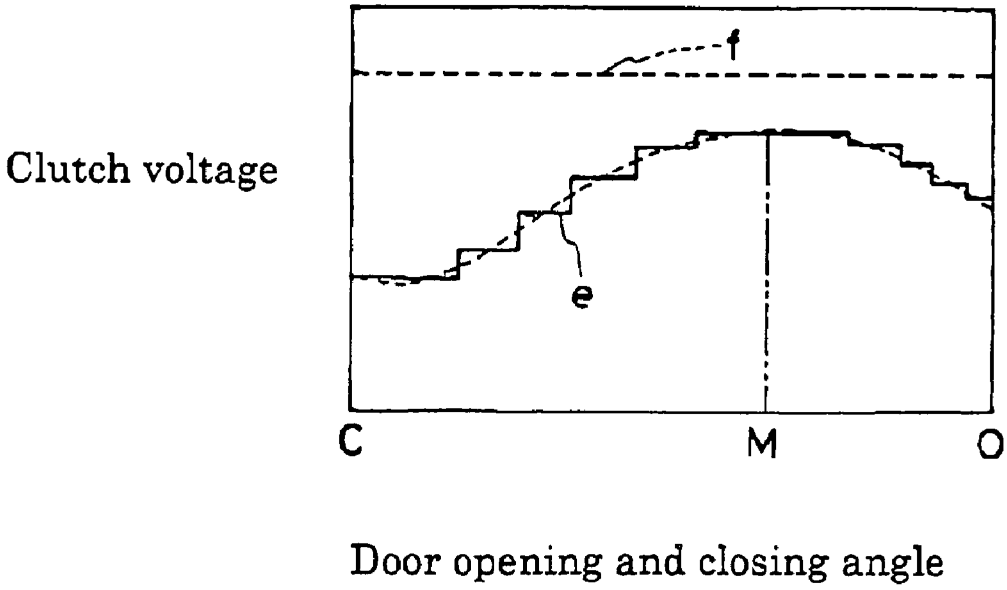

The foregoing and additional features and characteristics of the present invention will become more apparent from the following detailed description considered with reference to the accompanying drawing figures in which like reference numerals designate like elements and wherein:

FIG. 1 illustrates the onboard condition of the opening and closing control system for the opening-closing member according to the current invention, FIG. 2 illustrates a perspective view of the opening and closing device of the opening and closing control system of the opening-closing member according to the current invention, FIG. 3 illustrates a side cross-sectional view of a clutch mechanism of the opening and closing control system of the opening-closing member according to the current invention, FIG. 4 illustrates a cross-sectional view of FIG. 3 along I—I line, FIG. 5 illustrates a side cross-sectional view of an opening and closing mechanism of the opening and closing control system of the opening-closing member according to the current invention, FIG. 6 illustrates a flat cross-sectional view of the opening and closing mechanism of the opening and closing control system of the opening-closing member according to the current invention, FIG. 7 is a drawing for explaining the operation of the opening and closing mechanism of the opening and closing control system of the opening-closing member according to the current invention, FIG. 8 is a drawing for explaining the supporting force required for supporting the opening-closing member by the opening and closing device of the opening and closing control system of the opening-closing member according to the current invention, and FIG. 9 is a drawing for explaining the electric power supplied from control means to an electromagnetic clutch in the opening and closing control system of the opening-closing member according to the current invention.

DETAILED DESCRIPTION OF THE INVENTION

An embodiment of the present invention will be explained referring to attached drawings. An opening and closing control system 10 (a system 10) moves a rear door 2 (opening-closing member of the vehicle) of a vehicle body 1 (vehicle) between an opening position ((a) in FIG. 1) and the closing position ((b) in FIG. 1) as shown in FIG. 1. The door 2 is moved by a door opening and closing device 11 which comprises the system 10. An ECU 12 (controlling means) comprising the door opening and closing system 10 is provided on the side of the vehicle body 1. The ECU 12 controls the operation of the door opening and closing device 11.

The door opening and closing device is shown in FIG. 2. As shown in FIG. 2, the door opening and closing device 11 is comprised as a unit including a crank mechanism 13 (opening and closing mechanism), a clutch mechanisms 14 (electromagnetic clutch), and a motor 16 (actuator). These components are housed in a base 16 which forms the outer shell of the door opening and closing device 11. The base 16 is formed by almi-diecast for having a depressing space in which each component is housed. The base 16 is assembled by mounting devices (i.e. bolt) to the rear of the vehicle body 1 near the car roof.

As shown in FIG. 2, the motor 15 is provided at the edge portion of the door opening and closing device 11. The ECU 12 is electrically connected to the motor 15 and controls the amount of feeding electricity required for driving the motor 15. A worm gear 16*a* (shown in FIG. 4) is provided at the output shaft of the motor 16. The worm gear 15*a* is rotated by a drive of the motor 15.

As shown in FIG. 3 and FIG. 4, the clutch mechanism 14 is housed in a metal housing 20. The clutch mechanism 14 includes a wheel gear 21, an armature 22, a rotor 23, an electromagnet coil member 24 and a rotating shaft 25 etc. The rotating shaft 25 is relatively rotatably supported by the housing 20 through bearing. The wheel gear 21 is relatively rotatably supported by the rotating shaft 25 through spacer being meshing with the worm gear 15*a*. The disc shaped rotor 23 made of magnetic material is integrally rotatably fixed to the rotating shaft 25. The armature 22 made of magnetic material is supported by the rotating shaft 25 through a spacer rotatably relative to the rotating shaft 25 and movably in axial direction (vertical direction in FIG. 3). An output gear 26 is provided at an edge portion 25*a* (lower edge portion in FIG. 3) of the housing 20 of the rotating shaft 25 integrally rotatably with the rotating shaft 26.

The armature 22 is provided between the wheel gear 21 and the rotor 23. A front surface 22*a* (upper surface) of the armature 22 faces to the wheel gear 21, and a back surface 22*b* (lower surface) of the armature 22 faces to a front surface 23*a* of the rotor 23. Plural projections 21*a* are formed on the wheel gear 21, and plural hole portions 22*c* are formed on the front surface 22*a* of the armature 22. The projections 21*a* are inserted into the hole portions 22*c*, so that the armature 22 rotates integrally with the wheel gear 21.

The electromagnet coil member 24 is provided around the rotating shaft 25. The electromagnet coil member 24 includes a core 24*b* made of magnetic material and being and a coil 24*c*. A circular depressed portion 24*a* is formed on the core 24*b*, and the coil 24*c* is electrically connected to the ECU 12. The ECU 12 variably controls the feeding amount (voltage) to the coil 24*c*.

The operation of the clutch mechanism will be explained as follows. Once the ECU 12 supplies a power to the coil 24*c*, electromagnetic force which magnetizes the armature 22 toward the rotor 23 (upper direction in FIG. 2) is generated. As a result, the armature 22 moves toward the rotor 23 in shaft direction, and the back surface 22*b* of the armature 22 frictionally engages with the front surface 23*a* of the rotor 23. Thus, the clutch mechanism 14 becomes engaged, and a rotating torque of the wheel gear 21 is transmitted to an output gear 26 side. On the other hand, once the ECU 12 stops supplying the power to the coil 24*c*, the generation of the electromagnetic force which magnetizes the armature 22 toward the rotor 23 is stopped, as a result, the armature 22 frictionally disengages from the rotor 23. As a result, the clutch mechanism 14 becomes disengaged. Specifically, the clutch mechanism 14 connects the motor 15 and the crank mechanism 13 for being adapted to intermittently transmit the torque between the motor 15 and the crank mechanism 13. As described above, the ECU 12 can variably controls the feeding amount (voltage) to the coil 24*c*, so that it is possible that the clutch mechanism 14 become engaged while the torque transmission from the armature 22 to the rotor 23 has been lost (while the clutch mechanism 14 is sliding).

A ring magnet 27 is fixed on the outer peripheral edge of the rotor 23. Plural pairs of magnetic poles are magnetized one after another on the magnet 27. As shown in FIG. 4, a sensor 28 (opening and closing angle detecting means) is provided in the housing 20 relative to the magnet 27. The sensor 28 is electrically connected to the ECU 12 and includes a hall element therein. The sensor 28 detects the rotation number and the rotating direction of the rotor 23 by detecting a switching operation of the magnetic direction of the magnetic force formed by the magnet 27. The opening and closing angle of the door 2 relative to the vehicle body 1 is obtained by the ECU 12 based on the output signal from the sensor 28.

The crank mechanism 13 will be explained according to FIG. 5. FIG. 6. FIG. 5 is simplified to avoid a complexity. The crank mechanism 13 includes a crank gear 30 (crank gear), a crank arm 31 (crank arm), a slider 32 (slider), a door arm 33 (operating member for opening-closing member), and a guide member 34 (guide member).

The crank gear 30 is rotatably provided on the base 16 around a crank shaft 30*a* (crank shaft). An intermediate gear mechanism 27 meshes with the crank gear 30 and the output gear 26 of the clutch mechanism 14. In other word, a decelerating mechanism is formed between the output gear 26 and the crank gear 30.

One end of the crank arm 31 is rotatably connected to the crank gear 30 by a crank pin 31*a* (crank pin). The other side of the crank arm 31 is rotatably connected to the slider 32 by a slider pin 31*b* (slider pin). The length of the crank arm 31 can be set to fit based on, for example, a radius of the crank gear 30. For instance, when the length of the crank arm 31 is set to be long, an angle of the crank arm 31 relative to the slider 31 is decreased, and a rotation angle of the crank arm 31 is decreased, so that the drive is smoothly transmitted to the slider 31. On the other hand, when the length of the crank arm 31 is set to be short, the size of the door opening and closing device 11 becomes more compact. However, the rotating angle of the crank arm 31 is increased, so that that a transmitting efficiency of a drive to the slider 31 is decreased.

The slider 32 is for sliding the guide member 34 in longitudinal is direction of the vehicle (horizontal direction in FIG. 5). The slider 32 includes a roller member 32*a* and a roller member 32*b*. On the other hand, the guide member 34 extends in longitudinal direction of the vehicle (horizontal direction in FIG. 6) and includes a guide body 34*a* and a rail member 34*b*.

The roller member 32*a* and 32*b* of the slider 32 slides on the rail member 34*b*, so that the slider 32 is guided by the guide member 34.

As shown in FIG. 5, the arc-shaped door arm 33 is gently bending in upper direction of the vehicle. One end 33*a* of the door arm 33 is rotatably supported on the rotation shaft 32*c* of the roller member 32*b* of the slider 32. The other end 33*b* of the door arm 33 is rotatably connected to the door 2. As shown in FIG. 1, the door 2 is rotatably assembled to the vehicle body by a hinge 3. The connecting portion at which the other end 33*b* of the door arm 33 is connected to the door 2 is provided at approximately below the hinge 3 when the door 2 is closed.

The operation of the aforementioned door opening and closing device 11 will be explained. FIG. 7 shows each operation of the crank mechanisms 13 when the door 2 is in a closed position, an intermediate position and an opened position relative to the vehicle body 1. (a) in FIG. 7 shows the door in the closed position, (c) in FIG. 7 shows the door in the opened position, and (b) in FIG. 7 shows the door in the intermediate position. The intermediate position is a particular position which may not be a complete middle position between the opened position and the closed position. In other word, the distance from the opened position to the intermediate position may not be equal to the distance from the closed position to the intermediate position.

When the clutch mechanism 14 is engaged, and the crank mechanism 13 at the position (a) in FIG. 7 is driven by the motor 15 in forward direction, the crank gear 30 rotates in anti-clockwise direction in FIG. 7 around the crank shaft 30. As a result, the crank arm 31 moves in right direction in FIG. 7 for sliding the slides 32 along the guide member 34. In addition, the door arm 33 pushes up the door 2 at the other end 33*b*, as a result, the door 2 opens relative to the vehicle body 1. While this operation, the condition (a) in FIG. 7 of the crank mechanism 13 becomes the condition (b) in FIG. 7, and finally the crank mechanism 13 becomes the condition (c) in FIG. 7. On the other hand, when the crank mechanism 13 in condition (c) in FIG. 7 is driven by the motor 15 in backward direction, an opposite operation to the aforementioned operation will be performed, then the door closes relative to the vehicle body 1. While this operation, the condition (c) in FIG. 7 of the crank mechanism 13 becomes the condition (b) in FIG. 7, and finally the condition (c) in FIG. 7.

Each arrows in FIG. 7 shows extensions of arm lines 31*c* (arm lines) connecting the center of the crank pin 31*a* and the center of the slider pin 31*b* in each opened, intermediate and closed condition in FIG. 7. As shown in FIG. 7, positions and directions of arm lines 31*c* (arm lines) are supposed to be changed in accordance with the operation of the crank mechanism 13. As a result, a perpendicular line from the center of the crank shaft 30*a* to the arm line 31*c* in FIG. 7 is adapted to be changed in accordance with the door open-close operation. Specifically, the length of the perpendicular line d2 in the intermediate position (b) in FIG. 7 is to be longer than a length of the perpendicular line d1 in the closed position (a) in FIG. 7 (closed position perpendicular line) and a length of the perpendicular lined d3 in the opened position (c) in FIG. 7 (opened position perpendicular line).

The supporting force of the door opening and closing device 11 for supporting the door 2 (supporting force) will be explained in the aforementioned configuration. When the door 2 is opened or closed, and a force (abnormal load) is applied to the door 2 in opposite direction relative to the operation direction of the door 2 (the force may applied directly to the door 2 by the driver or applied by and engagement between the door 2 and object), a torque can be transmitted from the door 2 to the motor 15 through the crank mechanism 13 and the clutch mechanism 14. When the abnormal load becomes equal to or more than the predetermined amount, the armature 22 can rotates relative to the rotor 23 even if a frictional engaging force is generated between the back surface 22*b* of the armature of the clutch mechanism 14 and the front surface 23*a* of the rotor 23 (the clutch mechanism 14 can slide). As a result, the door 2 becomes operatably independent from the drive of the motor 15. In other word, when the abnormal load becomes equal to or less than the predetermined amount, the door opening and closing device 11 can support the door 2. In other words, the predetermined amount is the supporting force.

When the door 2 is in the condition (a), (b), and (c), and the same abnormal load is applied to each condition, the abnormal load is transmitted as follows. When the length of the perpendicular line d is short as shown in (a) and (c) in FIG. 7, a moment arm of the crank shaft 30*a* becomes shorter, as a result, the torque transmitted to the crank gear 30 from the door arm 33 and the slider 32 side becomes smaller than a torque in condition (b) in FIG. 7. A relationship between the opening and closing angle of the door 2 and the supporting force is shown in line (a) in FIG. 8, when the engaging force of the clutch mechanism 14 is constant. As shown in FIG. 8, if the engaging force of the clutch mechanism 14 is constant, the supporting force becomes larger near the opening or the closing position C rather than near that intermediate position M.

A relationship between the opening and closing angle of the door 2 and the electric power supply (voltage) supplied by the ECU 12 supplies to the coil 24*c* of the clutch mechanism 14 will be explained based on the FIG. 9. According to the current invention, the electric power (voltage) becomes smaller as the position of the door 2 is getting closer to the opening position O and the closing position C rather than the electric power when the door 2 is in the intermediate position M as shown in line (e) in FIG. 9. In other word, the electric power supplied to the coil 24*c*, and furthermore, the engaging force of the clutch mechanism 14 are controlled based on the opening and closing angle of the door 2. Thus, the engaging forces of the clutch mechanism 14 near the opening and the closing position C are controlled to be getting smaller than the engaging force of the clutch mechanism 14 in intermediate position M. The opening and closing angle of the door 2 is obtained by the ECU 12 based on the signal from the sensor 28 as described above. The maximum electric power supplied by the ECU 12 is shown in line (f) in FIG. 9, and the ECU 12 controls within a range of the electric power which is smaller than the maximum electric power. Thus, the electric power shown in e in FIG. 9 is secured even if the maximum electric power supplied by the ECU 12 is decreased due to a secular distortion. According to the embodiment of the current invention, the ECU 12 controls electric power in a staircase pattern as shown in a solid line in FIG. 9, however, the electric power can be changed smoothly as shown in dashed line in FIG. 9.

A relationship between the opening and closing angle of the door 2 and the amount of supporting force of the door 2 (actual amount of supporting force) is explained in line (b) in FIG. 8 when the ECU 12 controls the electric power. As shown in FIG. 8, the amount of the supporting force at the opening and the closing position C becomes approximately the same as the amount of the supporting force at the intermediate position M by controlling the engaging force of the clutch mechanism 14 to be small. In other word, the supporting force is approximately constant even if the opening and closing angle of the door 2 is changed.

As the electric power is controlled in this way, following effects are obtained in the system 10 according to the current invention. For example, suppose the abnormal load F1 is applied to the door 2 which is operated at a position X1 near the opened position. When the engagement force of the clutch mechanism 14 is consistently constant because the ECU 12 supplies uncontrolled power, the clutch mechanism 14 cannot be slid due to the power F1 being smaller than the supporting force. As a result, the abnormal load is applied to the door 2 and the crank mechanism 13. On the other hand, when the ECU 12 controls the electric power which is shown in line (b) in FIG. 8, the clutch mechanism can be slid due to the power F1 being larger than the supporting force. In other word, the abnormal load is not applied to the door 2 etc. because the torque escapes from the clutch mechanism 14. As a result, it is difficult to be damaged for the door 2 and the crank mechanism 13 due to not applying the abnormal load.

In this ways, the opening-closing member for vehicle is explained referring to the door 2 (back door) for opening and closing the rear portion of the vehicle body 1 in the embodiment, however, the current invention is not limited to be applied to the door 2 (back door). The opening closing member of the vehicle can also be applied to a slide door or a sunroof as long as they are they are automatically operated.

According to the current invention, if the opening and closing mechanism changes the supporting force of the opening and closing mechanism for vehicle based on the opening and closing angle of the opening closing member for vehicle, the necessary force for sliding the electromagnetic clutch (necessary force) can be constant by controlling the engaging force of the electromagnetic clutch even if the opening and closing angle changes. Specifically, the necessary force becomes constant on the position at which the supporting force of the opening and closing mechanism for the opening-closing member for vehicle becomes large by controlling the engaging force of the electromagnetic clutch to be small even if the opening and closing angle of the opening-closing member for vehicle changes.

Thus, the current invention can prevent the necessary force on the opening position and the closing position from being large. In other word, according to the prevent invention, the necessity forces at the opening position and the closing position can be controlled being approximately the same as the necessity force at the intermediate position.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in claims, be embraced thereby.

What is claimed is:

1. An opening and closing control system for an opening-closing member of a vehicle comprising:

an opening and closing mechanism for opening and closing the opening-closing member relative to the vehicle;

an actuator for operating the opening and closing mechanism;

an electromagnetic clutch for controlling a torque transmission by connecting and disconnecting the actuator and the opening and closing mechanism;

an opening and closing angle detecting means for detecting an opening and a closing angle of the opening-closing member relative to the vehicle; and a control means for varying an electric power supplied to the electromagnetic clutch after power supply to the electromagnetic clutch is initiated and before power supply to the electromagnetic clutch ceases based on a detected result from the opening and closing angle detecting means.

2. An opening and closing control system for an opening-closing member of a vehicle according to claim 1, wherein a supporting force of the opening and closing mechanism required for supporting the opening-closing member of the vehicle is increased in accordance with the movement of the opening-closing member of the vehicle from an intermediate position to an opened position or a closed position, and the control means decreases the electric power supplied to the electromagnetic clutch in accordance with the movement of the opening-closing member of the vehicle from the intermediate position to the opened position or the closed position.

3. An opening and closing control system for an opening-closing member of a vehicle according to claim 2, wherein the opening and closing mechanism includes a crank gear provided rotatably around a crank shaft for opening and closing the opening-closing member of the vehicle, a slider reciprocating along with a guide member, a crank arm pivotally connected to the crank gear on one end thereof with a crank pin and pivotally connected to the slider on the other end thereof with a slider pin, and an operating member for the opening-closing member for operatively connecting the slider and the opening-closing member of the vehicle, and wherein a length of a perpendicular line, which vertically connects a center of the crank shaft and an arm line connecting a center of the crank pin and a center of the slider pin, or an extension of the arm line in longitudinal direction, when the opening-closing member of the vehicle is located at the intermediate position, is longer than the length of the perpendicular line when the opening-closing member of the vehicle is located at the opened position and the closed position.

4. An opening and closing control system for an opening-closing member of a vehicle according to claim 3, wherein the length of the perpendicular line, which vertically connects the center of the crank shaft and the arm line connecting the center of the crank pin and the center of the slider pin, or the extension of the arm line in longitudinal direction, is gradually decreased in accordance with the movement of the opening-closing member of the vehicle from the intermediate position to the opened position or the closed position.

5. An opening and closing control system for an opening-closing member of a vehicle according to claim 3, wherein the crank arm is provided between the crank gear and the slider, and the slider is provided between the crank arm and the opening-closing member of the vehicle.

6. An opening and closing control system for an opening-closing member of a vehicle comprising:

an opening and closing mechanism for opening and closing the opening-closing member relative to the vehicle;

an actuator for operating the opening and closing mechanism;

an electromagnetic clutch for controlling torque transmission by connecting and disconnecting the actuator and the opening and closing mechanism;

an opening and closing angle detecting means for detecting an opening and a closing angle of the opening-closing member relative to the vehicle; and a control means for varying electric power supplied to the electromagnetic clutch after the electromagnetic clutch connects the actuator and the opening and closing mechanism and before the electromagnetic clutch disconnects the actuator and the opening and closing mechanism based on a detected result from the opening and closing angle detecting means.

7. An opening and closing control system for an opening-closing member of a vehicle according to claim 6, wherein a supporting force of the opening and closing mechanism required for supporting the opening-closing member of the vehicle is increased as the opening-closing member of the vehicle moves from an intermediate position to an opened position or a closed position, and the control means decreases the electric power supplied to the electromagnetic clutch as the opening-closing member of the vehicle moves from the intermediate position to the opened position or the closed position.

8. An opening and closing control system for an opening-closing member of a vehicle according to claim 7, wherein the opening and closing mechanism comprises a crank gear rotatably provided around a crank shaft for opening and closing the opening-closing member of the vehicle, a slider movable in a reciprocating manner along with a guide member, a crank arm pivotally connected to the crank gear on one end thereof with a crank pin and pivotally connected to the slider on the other end thereof with a slider pin, and an operating member operatively connecting the slider and the opening-closing member of the vehicle, and wherein a length of a perpendicular line vertically connecting a center of the crank shaft and an arm line connecting a center of the crank pin and a center of the slider pin, or an extension of the arm line in a longitudinal direction, when the opening-closing member of the vehicle is located at the intermediate position is longer than the length of the perpendicular line when the opening-closing member of the vehicle is located at the opened position and the closed position.

9. An opening and closing control system for an opening-closing member of a vehicle according to claim 8, wherein the length of the perpendicular line vertically connecting the center of the crank shaft and the arm line connecting the center of the crank pin and the center of the slider pin, or the extension of the arm line in longitudinal direction, gradually decreases as the opening-closing member of the vehicle moves from the intermediate position to the opened position or the closed position.

10. An opening and closing control system for an opening-closing member of a vehicle according to claim 8, wherein the crank arm is provided between the crank gear and the slider, and the slider is provided between the crank arm and the opening-closing member of the vehicle.

* * * * *